(12) United States Patent
Shin et al.

(10) Patent No.: US 12,363,534 B2
(45) Date of Patent: Jul. 15, 2025

(54) ACCESS POINT AND COMMUNICATION CONNECTION METHOD THEREFOR

(71) Applicants: Samsung Electronics Co., Ltd., Suwon-si (KR); GEORGIA TECH RESEARCH CORPORATION, Atlanta, GA (US)

(72) Inventors: Junbum Shin, Suwon-si (KR); Fan Sang, Atlanta, GA (US); Meng Xu, Atlanta, GA (US); Taesoo Kim, Atlanta, GA (US)

(73) Assignees: Samsung Electronics Co., Ltd., Suwon-si (KR); GEORGIA TECH RESEARCH CORPORATION, Atlanta, GA (US)

( * ) Notice: Subject to any disclaimer, the term of this patent is extended or adjusted under 35 U.S.C. 154(b) by 256 days.

(21) Appl. No.: 17/860,804

(22) Filed: Jul. 8, 2022

(65) Prior Publication Data

US 2022/0345890 A1    Oct. 27, 2022

Related U.S. Application Data

(63) Continuation of application No. PCT/KR2020/019288, filed on Dec. 29, 2020.

(30) Foreign Application Priority Data

Jan. 13, 2020  (KR) .................. 10-2020-0004480

(51) Int. Cl.
*H04W 12/08* (2021.01)
*H04W 12/06* (2021.01)
*H04W 88/08* (2009.01)

(52) U.S. Cl.
CPC .......... *H04W 12/08* (2013.01); *H04W 12/06* (2013.01); *H04W 88/08* (2013.01)

(58) Field of Classification Search
CPC ...... H04W 12/08; H04W 12/06; H04W 88/08
See application file for complete search history.

(56) References Cited

U.S. PATENT DOCUMENTS 9,210,554 B2  12/2015  Sato et al.
10,140,445 B2  11/2018  Suzuki
(Continued)

FOREIGN PATENT DOCUMENTS

JP  2005-064737 A  3/2005
JP  5659875 B2  1/2015
(Continued)

OTHER PUBLICATIONS

ROME: Routing to a Secure Home, Submission to ACM CCS, Submitted on May 15, 2019, London, UK.
(Continued)

*Primary Examiner* — Diane D Mizrahi
(74) *Attorney, Agent, or Firm* — Jefferson IP Law, LLP

(57) ABSTRACT

An access point and a communication connection method are provided. The access point includes a communication apparatus for supporting a wireless communication network, a memory that stores a plurality of passwords for connection to the wireless communication network and authority information for each of the plurality of passwords, and a processor that, when an electronic device requests connection including one of the plurality of passwords for connection to the wireless communication network, grants the electronic device an authority corresponding to the password through which connection has been made, on the basis of the stored authority information.

15 Claims, 10 Drawing Sheets

(56) References Cited

U.S. PATENT DOCUMENTS

| | | |
|---|---|---|
| 10,321,423 B2 | 6/2019 | Liu et al. |
| 10,757,096 B2 | 8/2020 | Kim |
| 10,904,028 B2 | 1/2021 | Jang et al. |
| 2008/0201764 A1 | 8/2008 | Lu et al. |
| 2015/0249946 A1 | 9/2015 | Oh |
| 2017/0242557 A1 | 8/2017 | Rotschield et al. |
| 2018/0092011 A1* | 3/2018 | Lin .................. H04W 84/12 |
| 2018/0343167 A1 | 11/2018 | Malhotra et al. |
| 2019/0158975 A1 | 5/2019 | Petersen |
| 2019/0296932 A1 | 9/2019 | Jang et al. |

FOREIGN PATENT DOCUMENTS

| | | |
|---|---|---|
| JP | 6068328 B2 | 1/2017 |
| KR | 10-2005-0112805 A | 12/2005 |
| KR | 10-0600747 B1 | 7/2006 |
| KR | 10-1451163 B1 | 10/2014 |
| KR | 10-2016-0058044 A | 5/2016 |
| KR | 10-1668550 B1 | 10/2016 |
| KR | 10-1689613 B1 | 12/2016 |
| KR | 10-1876183 B1 | 8/2018 |
| KR | 10-1980039 B1 | 5/2019 |
| KR | 10-2019-0076382 A | 7/2019 |

OTHER PUBLICATIONS

Korean Office Action dated Aug. 21, 2024, issued in Korean Patent Application No. 10-2020-0004480.

\* cited by examiner

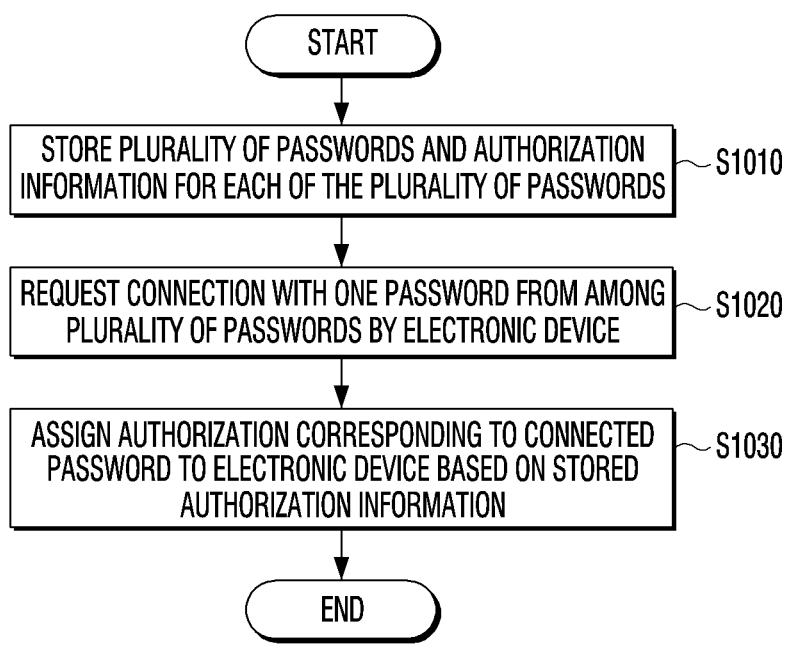

ACCESS POINT AND COMMUNICATION CONNECTION METHOD THEREFOR

CROSS-REFERENCE TO RELATED APPLICATION(S)

This application is a continuation application, claiming priority under § 365(c), of an International application No. PCT/KR2020/019288, filed on Dec. 29, 2020, which is based on and claims the benefit of a Korean patent application number 10-2020-0004480, filed on Jan. 13, 2020, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD., and 2) GEORGIA TECH RESEARCH CORPORATION.

BACKGROUND

1. Field

The disclosure relates to an access point and a communication connection method therefor. More particularly, the disclosure relates to an access point through which an authorization of an electronic device or an Internet of Things (IoT) device may be easily set using a plurality of passwords having different authorizations from one another and a communication connection method therefor.

2. Description of Related Art

With developments in computer technology, communication technology and home electronics technology, a network management service through which devices and systems within a home or a factory are connected to through a network and managed has emerged, and is receiving much attention as a future-orientated technology.

All devices within the home or factory that are connected through the network may transmit data between one another, and communicate with various electronic devices. For example, a user may control all electronic devices within the home without any restrictions in time and place using a user interface (UI) provided in electronic devices such as a smartphone.

Particularly, building of home networks using Internet of Things (IoT) devices have increased recently, and as the IoT devices forming the home network are closely associated with private lives of individuals, there is a demand for a method to set authorizations for each IoT device more easily.

The above information is provided as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an access point through which an authorization of an electronic device or an IoT device may be easily set using a plurality of passwords having different authorizations from one another and a communication connection method therefor.

Additional aspects will be set forth in part in the description which follows and, in part, will be apparent from the description, or may be learned by practice of the presented embodiments.

In accordance with an aspect of the disclosure, an access point is provided. The access point includes a communication device configured to support a wireless communication network, a memory configured to store a plurality of passwords and authorization information for each of the plurality of passwords to connect to the wireless communication network, and a processor connected to the communication device and the memory, the processor configured to receive, from an electronic device, a connection request to connect to the wireless communication network, the connection request including a password from among the plurality of passwords, and assign, to the electronic device, based on the password, an authorization to connect to the wireless communication network, wherein the authorization to connect to the wireless communication network is based on the stored authorization information.

The authorization information or each of the plurality of passwords may include at least one from among an external network access authorization, an internal network access authorization, an access authorization for each IoT device connected to an internal network, or access authorization for a group of IoT devices connected to the internal network.

The processor may be configured to selectively connect the electronic device based on an access authorization corresponding to authorization information on the at least one.

The processor may be configured to store authorization information set based on a user command received through the communication device in the memory.

The processor may be configured to generate a one-time password corresponding to a pre-set authorization based on the user command, and delete the generated one-time password based on a connection between the access point corresponding to the generated one-time password and the electronic device ending.

The processor may be configured to analyze at least one packet which is received from the electronic device or from an IoT device included in the internal network, and identify an abnormal security state based on the analyzed at least one packet.

The processor may be configured to analyze at least one from among a traffic type, a maximum packet size, or a maximum data rate of the at least one packet transmitted from the electronic device or an IoT device included in the internal network, and identify the abnormal security state.

The processor may be configured to identify the abnormal security state based on a prior use history of the electronic device or each of the IoT devices included in the internal network.

The processor may be configured to identify an authorization accessible by the electronic device based on the stored authorization information and the password, and identify as an abnormal security state relating to access other than the identified authorization.

In accordance with another aspect of the disclosure, a communication connection method of an access point is provided. The communication connection method includes storing a plurality of passwords and authorization information for each of the plurality of passwords to connect to a wireless communication network, receiving, from an electronic device, a connection request to connect to the wireless communication network, the connection request including a password from among the plurality of passwords, and assigning, to the electronic device, based on the password, an authorization to connect to the wireless communication network, wherein the authorization to connect to the wireless communication network is based on the stored authorization information.

The method may further include connecting the electronic device to an internal network.

The authorization information for each of the plurality of passwords may include at least one from among an external network access authorization, an internal network access authorization, an access authorization for each IoT device connected to an internal network, or access authorization for a group of IoT devices connected to the internal network.

The storing may include storing authorization information set based on a user command received through a communication device.

The storing may include generating a one-time password corresponding to a pre-set authorization based on the user command, and deleting the generated one-time password, based on a connection between the access point corresponding to the generated one-time password and the electronic device ending.

The method may further include analyzing at least one packet received from the electronic device or from an IoT device included in the internal network, and identifying an abnormal security state based on the analyzed at least one packet.

The identifying may include analyzing at least one from among a traffic type, a maximum packet size, or a maximum data rate of the at least one packet transmitted from the electronic device or an IoT device included in the internal network, and identifying the abnormal security state.

The identifying may include identifying the abnormal security state based on a prior use history of the electronic device or each of the IoT devices included in the internal network.

The method may further include identifying an authorization accessible by the electronic device based on the stored authorization information and the password, and identifying as an abnormal security state access that is not based on the identified authorization.

The each of the plurality of passwords may be formed of a front end part and a rear end part, the front end part may be set based on the authorization information or a role, and the rear end part may be set with a text based on a user input or an arbitrarily arranged text.

According to an embodiment, a computer readable recording medium including a program for executing a communication connection method of an access point of which the method includes storing a plurality of passwords and authorization information for each of the plurality of passwords to connect to a wireless communication network, receiving, from an electronic device, a connection request to connect to the wireless communication network, the connection request including a password from among the plurality of passwords, and assigning, to the electronic device, based on the password, an authorization to connect to the wireless communication network, wherein the authorization to connect to the wireless communication network is based on the on the stored authorization information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flowchart illustrating a communication connection method of an access point according to an embodiment of the disclosure.

Throughout the drawings, it should be noted that like reference numbers are used to depict the same or similar elements, features, and structures.

DETAILED DESCRIPTION

Figure 1:
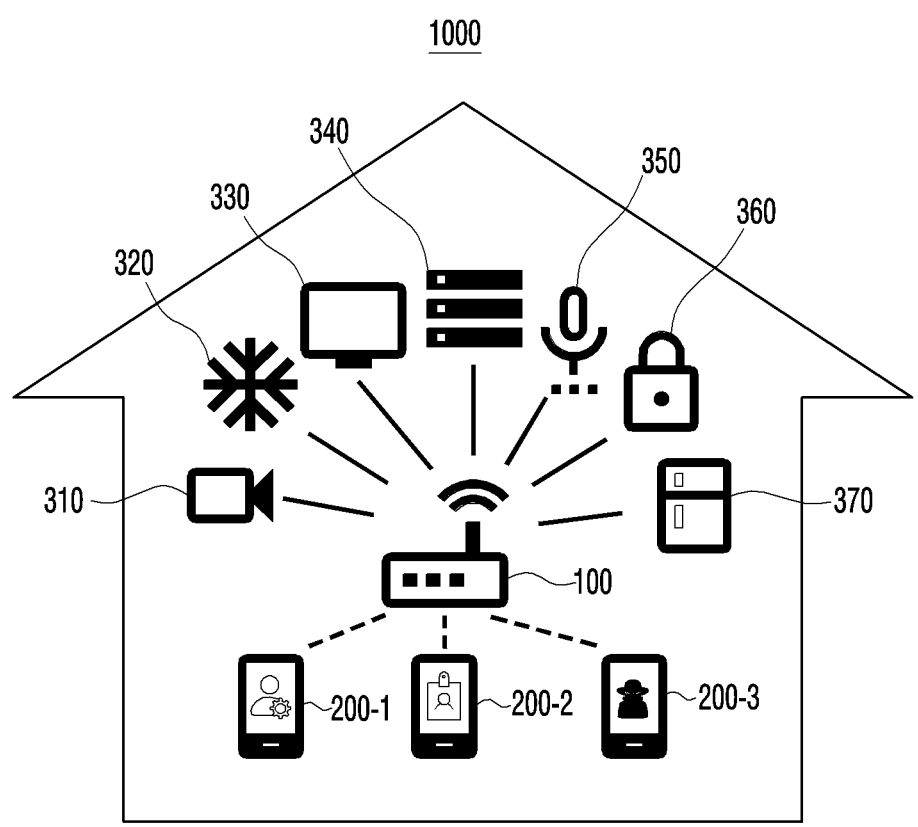
FIG. 1 is a diagram illustrating a system 1000 including an access point 100 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," or so on used in the disclosure may be used to refer to various elements regardless of order and/or importance, and may be used only to distinguish one element from another, but not limit the corresponding elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The disclosure will be described in greater detail below with reference to the drawings.

Figure 2:
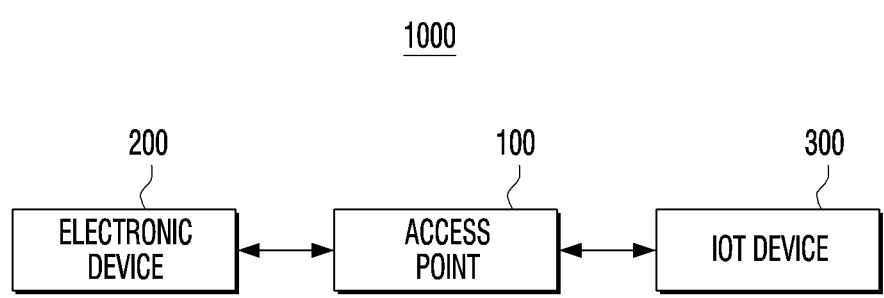
FIG. 2 is a diagram illustrating a block diagram of a system 1000 including an access point 100 according to an embodiment of the disclosure.

FIGS. 1 and 2 are diagrams illustrating a system 1000 which includes an access point 100, an electronic device 200, and an IoT device 300 according to various embodiments of the disclosure. Here, the access point 100 may be a device for connecting the electronic device 200 or the IoT device 300 to a home network system, and the electronic device 200 or the IoT device 300 may be connected to the access point 100 and use a wireless local area network (LAN) communication, or connected to the access point 100 and form a home area network (HAN) which will be described below. In an embodiment, the access point 100 may be implemented as an electronic device such as, for example, and without limitation, a refrigerator (or fridge), a washer, a television (TV), a set-top box, a cell phone, a tablet personal computer (PC), a kiosk, and the like.

Referring to FIGS. 1 and 2, the system 1000 may include the access point 100, the electronic device 200, and the IoT device 300. Further, the system 1000 may include the access point 100, first to third electronic devices 200-1, 200-2 and 200-3, a closed circuit television (CCTV) 310, an air conditioner 320, a TV 330, a server 340, an artificial intelligence (AI) speaker 350, a door lock 360, and a fridge 370. However, the above is merely one embodiment, and in addition to the above, the system 1000 may further include IoT devices 300 capable of connecting to the access point 100. In addition, although the electronic device 200 and the IoT device 300 have been separately described below for convenience of description, the electronic device 200 and the IoT device 300 may be connected to the access point 100 in the same method without being distinguished.

The electronic device 200 and the IoT device 300 included in the system 1000 may be connected with the access point 100 with at least one from among a wired and wireless means. Specifically, the first to third electronic devices 200-1, 200-2 and 200-3 and the CCTV 310, the air conditioner 320, the TV 330, the server 340, the AI speaker 350, the door lock 360, and the fridge 370 included in the system 1000 may be connected to the access point 100 using one password from among a plurality of passwords stored in the access point 100.

Here, the plurality of passwords stored in the access point 100 may be a secret key which is required to connect to the access point 100. In addition, the plurality of passwords stored in the access point 100 may have different authorizations for accessing other electronic devices for each password. Then, the plurality of passwords stored in the access point 100 may be duplicated and used by other respective electronic devices.

Then, each of the plurality of passwords may be formed into a front end part and a rear end part, and the front end part may be set based on authorization information or role, and the rear end part may be set with a text based on a user input or an arbitrarily arranged text. For example, the password corresponding to light bulbs arranged in a bedroom may be bedroomlight_qwer1234. The bedroomlight may correspond to the front end part and mean authorization information or role corresponding to the relevant password, and qwer1234 may mean a text based on the user input.

Specifically, each of the first to third electronic devices 200-1, 200-2 and 200-3, the CCTV 310, the air conditioner 320, the TV 330, the server 340, the AI speaker 350, the door lock 360, and the fridge 370 may request connection to the access point 100 using one password from among the plurality of passwords stored in the access point 100.

Then, the electronic device 200 or the IoT device 300 may request connection to the access point 100 using the same password. When the plurality of electronic devices 200 or the IoT devices 300 requests connecting to the access point 100 using the same password, because the authorization information corresponding to the password is the same, each of the plurality of electronic devices 200 or the IoT devices 300 may have the same authorization for accessing other IoT devices.

For example, when the second electronic device 200-2 and the third electronic device 200-3 request connection to the access point 100 using the same password, the second electronic device 200-2 and the third electronic device 200-3 may have the same authorization for accessing the other electronic devices. For example, the second electronic device 200-2 and the third electronic device 200-3 may not access the door lock 360, and may access the TV 330.

The access point 100 may store the plurality of passwords, and store authorization information corresponding to each of the stored plurality of passwords. Functions and operations of the access point 100 will be described in detail below with reference to FIG. 3.

Then, the IoT device 300 included in the system 1000 may form the HAN connected to the access point 100. Specifically, the CCTV 310, the air conditioner 320, the TV 330, the server 340, the AI speaker 350, the door lock 360, and the fridge 370 included in the HAN may be directly or indirectly interconnected, and control other electronic devices according to the authorization assigned. However, this is merely one embodiment, and home appliances capable of communication may be additionally included in addition to the IoT devices shown at implementation.

Figure 3:
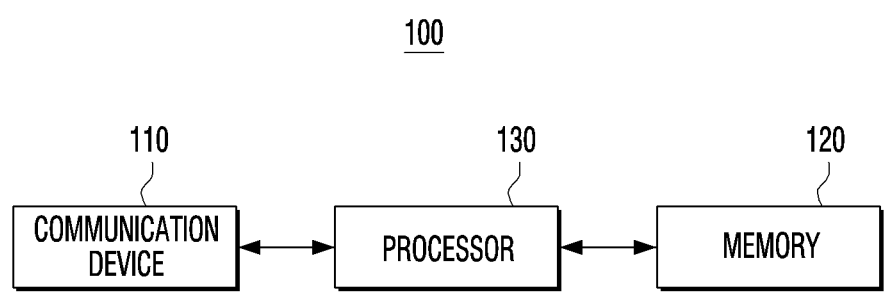
FIG. 3 is a diagram schematically illustrating a block diagram of an access point 100 according to an embodiment of the disclosure.

FIG. 3 is a diagram schematically illustrating a block diagram of the access point 100 according to an embodiment of the disclosure.

Referring to FIG. 3, the access point 100 may include a communication device 110, a memory 120, and a processor 130. The configurations shown in FIG. 3 are example diagrams for realizing embodiments of the disclosure, and hardware and software configurations which are appropriate to a level obvious to those skilled in the art may be additionally included to the access point 100.

Specifically, the communication device 110 may perform communication with various external devices. Particularly, the communication device 110 may perform communication with the electronic device 200 and the IoT device 300. Specifically, the communication device 110 may support the electronic device 200 and the IoT device with a wireless communication network. Using the wireless communication network received from the communication device 110, the electronic device 200 and the IoT device 300 may be connected to the access point 100 and an external network. That is, the communication device 110 may be connected to the HAN which includes a wired communication network.

The communication device 110 may be implemented with a wireless fidelity (Wi-Fi) module. That is, the Wi-Fi module of the communication device 110 may receive connection information (e.g., service set identifier (SSID), encryption key information, etc.) received from the electronic device 200 and the IoT device 300, and perform communication with the electronic device 200 and the IoT device 300 based on the received connection information.

The memory 120 may store at least one command or data associated with at least one other element of the access point 100. Particularly, the memory 120 may be implemented as a non-volatile memory, a volatile memory, a flash-memory, a hard disk drive (HDD), a solid state drive (SSD), or the like. The memory 120 may be accessed by the processor 130 and reading/writing/modifying/deleting/updating of data and the like may be performed by the processor 130. In the disclosure, the term 'memory' may include the memory 120, a read only memory (ROM; not shown) in the processor 130, a random access memory (RAM; not shown), or a memory card (not shown; e.g., a micro SD card, a memory stick) mounted to the access point 100.

Particularly, the memory 120 may store the plurality of passwords and authorization information for each of the plurality of passwords to connect to the wireless communication network supported by the communication device 110 of the access point 100.

Here, the authorization information may include authorization information on at least one from among an external network access authorization, an internal network access authorization, an access authorization for each IoT device connected to an internal network, or a connection authorization for each group of the IoT devices included in the internal network for each password. Here, the external network may mean an internet network which is publicly accessible, and the internet network may mean an intranet or the HAN.

In addition, the memory 120 may generate a one-time password corresponding to a pre-set authorization based on a user command, and store the generated password. Specifically, the user command may include a command for setting authorization with which a portion from among the IoT devices 300 may be accessed. Alternatively, the user command may include a command for setting possible access times.

The processor 130 may be connected with the communication device 110 and the memory 120 and control the overall operation of the access point 100. Specifically, the processor 130 may assign, by executing the at least one command stored in the memory 120, an authorization corresponding to a password which is connected based on the stored authorization information to the electronic device 200 when the electronic device 200 requests connection with one password from among the plurality of passwords to connect to the wireless communication network.

Specifically, the processor 130 may identify whether the password with which the electronic device 200 requested connection matches a password which is pre-stored in the memory 120. The password pre-stored in the memory 120 may be a secret key which is required to connect to the access point 100. Then, the processor 130 may identify, based on the password with which connection was requested matching with the password pre-stored in the memory, authorization information corresponding to the password with which connection was requested. Because the password pre-stored in the memory 120 has different authorizations for accessing other electronic devices for each password, the processor may assign the authorization for accessing other electronic devices to the electronic device 200 based on authorization information corresponding to the password with which connection was requested.

In addition, the processor 130 may selectively connect the electronic device 200 to the IoT device 300 corresponding to the authorization assigned to the electronic device 200 from the HAN. Alternatively, the processor 130 may assign the same authorization to also the IoT device 300 from the HAN, and the IoT device 300 included in the HAN may be interconnected. That is, the processor 130 may selectively connect the IoT device 300 to another IoT device corresponding to the authorization assigned to the IoT device 300. The above described characteristic will be described in detail below in FIG. 5.

Then, the processor 130 may store the authorization information set based on the user command received through the communication device 110 in the memory. Specifically, the processor 130 may receive the user command from the electronic device 200 which includes at least one from among an input device 240 and a display 250 through the communication device 110. Alternatively, the user command may be received from the electronic device 200 in a form in which the electronic device 200 relays the command received from an external electronic device (e.g., AI speaker 350) which does not include the input device and the display.

The processor 130 may modify or generate the authorization information set based on the received user command.

The processor 130 may store the modified or generated authorization information in the memory 120. Specifically, the processor 130 may generate the one-time password corresponding to the pre-set authorization based on the user command, and when connection of the electronic device 200 with the access point 100 corresponding to the generated one-time password is completed, delete the generated one-time password.

Then, the processor 130 may receive information on an IoT device from the IoT device 300, and generate authorization information and a password based on the received IoT device information. Specifically, the IoT device information may include locations and purposes of each IoT device, and the processor 130 may assign authorization by grouping the IoT devices which are close based on the location of each IoT device. For example, the processor 130 may match an IoT device to the password by grouping based on the location of each IoT device such as a living room, a big room, and a small room.

In addition, the processor 130 may analyze at least one packet transmitted from the electronic device 200 or the HAN, and identify an abnormal security state based on the analyzed at least one packet. Specifically, the processor 130 may analyze a traffic type, a maximum packet size, a maximum data rate, and the like of at least one packet, and identify the abnormal security state based on the analyzed at least one packet. For example, the processor 130 may identify an abnormal security state through packet payload checking, and the identified abnormal state may be an attack which is present in a network.

Then, the processor 130 may identify the abnormal security state based on a prior use history of the packet of each of the electronic device or the HAN. For example, when traffic is generated from the door lock unusually at dawn, the processor 130 may identify the abnormal security state. Alternatively, the processor 130 may notify the user of a situation in which an abnormal security state is suspect.

In addition, the processor 130 may identify the authorization with which the electronic device 200 or the IoT device 300 may access relating to other devices based on the stored authorization information and the connected password. The processor 130 may analyze the packet or traffic from the connected electronic device 200 or IoT device 300 and identify as an abnormal security state relating to access other than the identified authorization. When the abnormal security state occurs, the processor 130 may block the relevant access, and stop the device in operation.

The processor 130 may determine a packet legitimacy (or appropriateness) and a situation legitimacy (or appropriateness) and reinforce a security state of the HAN.

In an embodiment, the processor 130 may prevent a port scanning attack by blocking a packet relating to a specific port. For example, based on the processor 130 detecting a port scanning attack which uses a transmission control protocol (TCP) synchronize (SYN) packet at a specific port, the processor 130 may protect the specific port so that scanning traffic is not returned by blocking the specific port.

Then, the processor 130 may limit an operation frequency of the electronic device 200 or the IoT device 300 by limiting a packet rate. For example, when operating a light 83 which is one from among the IoT devices 300 using the electronic device 200, the processor 130 may limit the packet rate of the light 83 to a specific rate (e.g., 3/s) according to a pre-set policy, and when the electronic device 200 receives a control command relating to the light 83 at a rate faster (e.g., 1/s) than the specific rate (e.g., 3/s), the processor 130 may not process the relevant control command. Alternatively, the processor 130 may process the command of the electronic device 200 at the specific rate (e.g., 3/s) which is set as a rate limit In addition, the processor 130 may limit a bandwidth between devices, and the processor 130 may easily recognize a security situation through an iperf bandwidth test.

Then, the processor 130 may set a controllable time. Specifically, the processor 130 may set an accessible time relating to the electronic device 200 or the IoT device 300 connected with the access point 100. For example, the processor 130 may set from 10 pm to 4 am as a late night time, and the processor 130 may set the accessible times for each authorization information in the late night time differently. Specifically, the processor 130 may block an external network access authorization in the late night time, or set only for a certain time (e.g., only 3 hours) as the accessible time.

The processor 130 may set to activate the access authorization for each device based on label presence information. Specifically, the processor 130 may set to activate the access authorization only when a device with a master authorization is connected to the access point 100. Here, the master authorization may have, as an authorization corresponding to an owner, the most access authorization from among the devices connected to the access point 100, or mean an authorization capable of changing or controlling a setting of the access point 100. That is, the processor 130 may not be able to control, when a device with master authorization is not connected to the access point 100, the device corresponding to the relevant access authorization even when a terminal device of a guest has access authorization.

Figure 4:
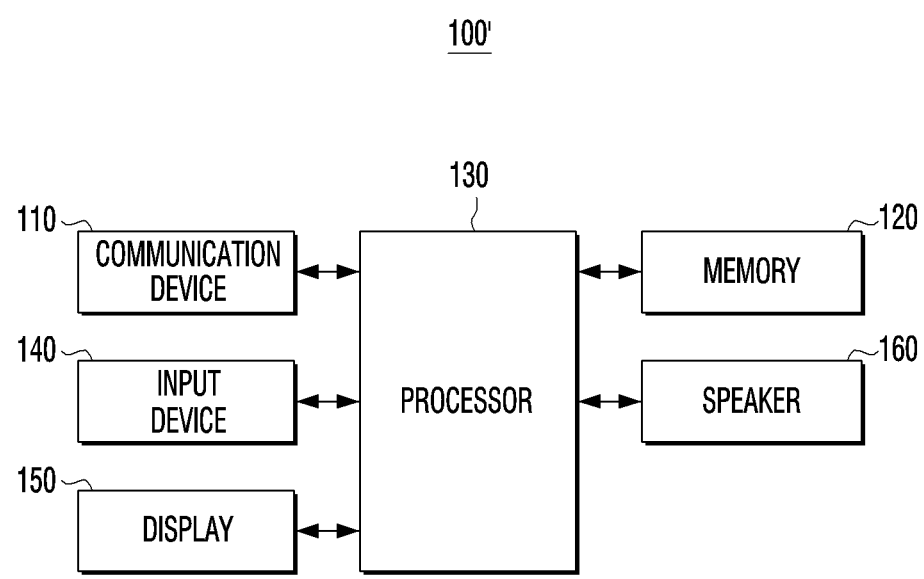
FIG. 4 is a diagram illustrating in detail a block diagram of an access point 100' according to an embodiment of the disclosure.

FIG. 4 is a diagram illustrating in detail a block diagram of an access point 100' according to an embodiment of the disclosure.

Referring to FIG. 4, the access point 100' may include the communication device 110, the memory 120, the processor 130, an input device 140, a display 150, and a speaker 160. Because descriptions associated with the communication device 110, the memory 120, and the processor 130 from among the configurations have been described in detail in FIG. 3, the descriptions will be omitted to avoid redundant descriptions.

The input device 140 may receive various user input and transmit to the processor 130. Particularly, the input device 140 may include a touch sensor, a (digital) pen sensor, a pressure sensor, a key, or a microphone. The touch sensor may use at least one method from among a capacitive type, a resistive type, an infrared type, or an ultrasonic type. The (digital) pen sensor may be, for example, a part of a touch panel, or include a separate sheet for detection. The microphone may be provided in the electronic device 200 or the IoT device 300 as a configuration for receiving a user voice, but this is merely one embodiment, and may be electrically connected to the access point by being provided outside of the access point 100.

The display 150 may provide various screens. Particularly, the display 150 may display the electronic device 200 or the IoT device 300 connected to the access point 100. The display 150 may be implemented to a display of various forms such as, for example, and without limitation, a liquid crystal display (LCD), an organic light emitting diode (OLED) display, a plasma display panel (PDP), and the like. In the display 150, a driving circuit, which may be implemented in the form of an a-si thin film transistor (TFT), a low temperature poly silicon (LTPS) TFT, an organic TFT (OTFT), or the like, a backlight unit, and the like may be included. The display 150 may be coupled with a touch panel and implemented as a touch screen.

The speaker 160 may be a configuration which not only outputs various audio data to which various processing operations are performed such as decoding, amplifying, and noise filtering by an audio processor (not shown), but also various notification sounds or voice messages. Particularly, an output terminal capable of outputting audio data may be included as a configuration for outputting audio other than the speaker.

Figure 5:
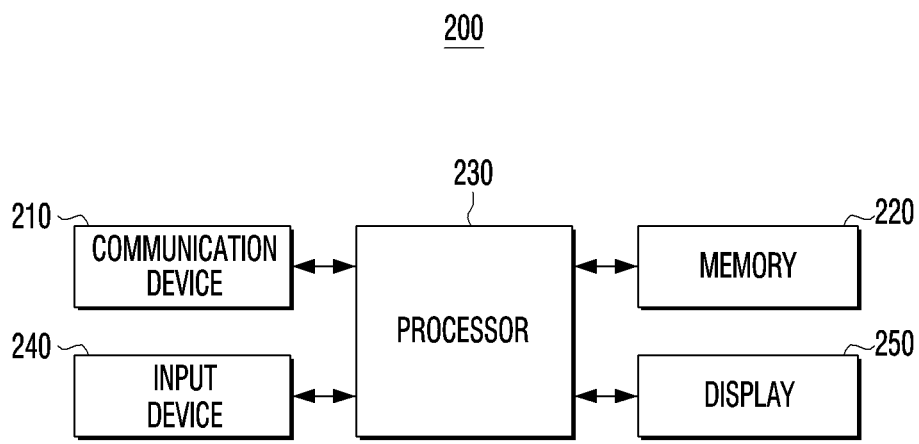
FIG. 5 is a diagram illustrating a block diagram showing a configuration of an electronic device 200 according to an embodiment of the disclosure.

FIG. 5 is a diagram illustrating a block diagram showing a configuration of the electronic device 200 according to an embodiment of the disclosure.

Referring to FIG. 5, the electronic device 200 may include a communication device 210, a memory 220, a processor 230, the input device 240, and the display 250. Although the electronic device 200 may be implemented as a mobile terminal device such as, for example, and without limitation, a smartphone, a tablet PC, a notebook PC, and the like, but this is merely one embodiment, and may be implemented as a product such as, for example, and without limitation, a desktop, a PC, a TV, and the like. The configurations shown in FIG. 5 are example diagrams for implementing the embodiments of the disclosure, and hardware and software configurations appropriate to a level obvious to those skilled in the art may be included in the electronic device 200.

The communication device 210 may perform communication connection with various devices outside of the electronic device 200. Specifically, the communication device 210 may connect to a wireless communication network which is supported from the access point 100. Particularly, the communication device 210 may be implemented as a Wi-Fi chip. That is, the Wi-Fi chip of the communication device 210 may search the access point 100 through a beacon message received from an external access point, and perform communication connection by using an encryption key with the searched access point 100.

In addition, the Wi-Fi chip may first transmit and receive various connection information such as SSID and encryption key, and transmit and receive various information after communicatively connecting using the same. The communication device 210 being implemented as a Wi-Fi is merely one embodiment, and may be implemented with other communication chips (e.g., 3rd Generation (3G), 3rd Generation Partnership Project (3GPP), long term evolution (LTE), etc.).

Particularly, the communication device 210 may perform communication connection with the access point 100 using a password, and the communication device 210 may transmit a connection request to the access point 100 together with the password.

The memory 220 may store a command or data related to at least one other element of the electronic device 200. Particularly, the memory 220 may be implemented as a non-volatile memory, a volatile memory, a flash-memory, a hard disk drive (HDD), a solid state drive (SSD), or the like. The memory 220 may be accessed by the processor 230, and reading/writing/modifying/deleting/updating and the like of data may be performed by the processor 230. In the disclosure, the term 'memory' may include the memory 220, a read only memory (ROM; not shown) in the processor 230, a random access memory (RAM; not shown), or a memory card (not shown; e.g., a micro SD card, a memory stick) mounted to the electronic device 200. Particularly, the memory 220 may be stored with various programs and data for performing cooperative transmission data communication. Particularly, the memory 220 may store data on an application for performing communication connection.

The processor 230 may control the overall operation of the electronic device 200 connected with the communication device 210, the memory 220, the input device 240, and the display 250. Particularly, the processor 230 may transmit a request for communication connection to the access point 100 by executing at least one instruction stored in the memory 220. At this time, the processor 230 may transmit the password received through the input device 240 to the access point 100, and be assigned with an authorization corresponding to the connected password from the access point 100.

The input device 240 may receive various user input and transmit to the processor 230. Particularly, the input device 240 may include the touch sensor, the (digital) pen sensor, the pressure sensor, the key, or the microphone. The touch sensor may use, for example, at least one method from among the capacitive type, the resistive type, the infrared type, or the ultrasonic type. The (digital) pen sensor may be, for example, a part of the touch panel, or include a separate sheet for detection. The key may include, for example, a physical button, an optical key, or a keypad. The microphone may be provided in the electronic device 200 as a configuration for receiving the user voice, but this is merely one embodiment, and may be electrically connected with the electronic device 200 by being provided outside of the electronic device 200.

The display 250 may provide various screens. Particularly, the display 250 may display a UI for receiving input of the password for connecting to the access point 100. The display may be implemented to a display of various forms such as, for example, and without limitation, a liquid crystal display (LCD), an organic light emitting diode (OLED) display, a plasma display panel (PDP), and the like. In the display 250, the driving circuit, which may be implemented in the form of an a-si TFT, a low temperature poly silicon (LTPS) TFT, an organic TFT (OTFT), or the like, the backlight unit, and the like may be included. The display 250 may be coupled with the touch panel and implemented as the touch screen.

Figure 6:
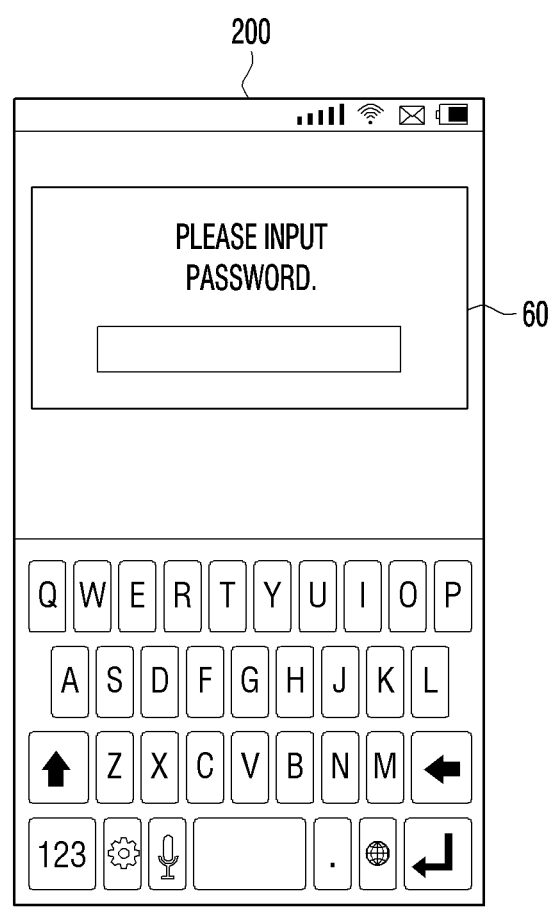
FIG. 6 is a diagram illustrating a method of connecting an electronic device 200 with an IoT device 300 according to an embodiment of the disclosure.

FIG. 6 is a diagram illustrating a method of connecting the electronic device 200 with the IoT device 300 according to an embodiment of the disclosure.

Referring to FIG. 6, the electronic device 200 may connect to the wireless communication network supported by the access point 100. The electronic device 200 may transmit the request for connecting to the wireless communication network to the access point 100. Specifically, the electronic device 200 may display a UI 60 for the user to directly input a password using the display, and transmit the password input through the UI 60 to the access point 100.

The access point 100 may identify, based on receiving the connection request from the electronic device 200, the input password. The access point 100 may perform the request for a response in a method of assigning authorization corresponding to the input password relating to the identified connection request.

Then, the electronic device 200 may control an accessible IoT device by being assigned authorization for accessing another device which includes the IoT device from the access point 100, and using the display or the input device included in the electronic device 200.

Figure 7:
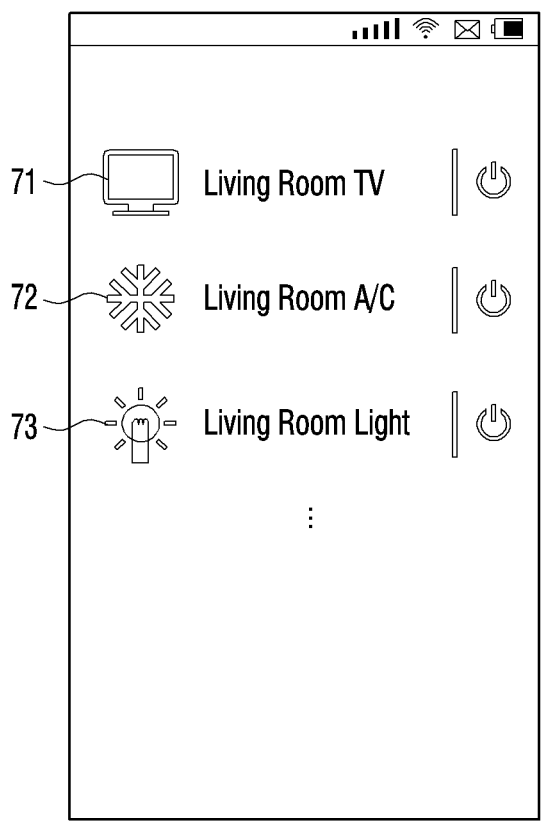
FIG. 7 is a diagram illustrating a method of controlling an IoT device 300 using an electronic device 200 according to an embodiment of the disclosure.

FIG. 7 is a diagram illustrating a method of controlling the IoT device 300 using the electronic device 200 according to an embodiment of the disclosure.

Referring to FIG. 7, the electronic device 200 may display an accessible IoT device based on the authorization assigned to the electronic device 200. The IoT device controllable by the electronic device 200 may be displayed with a UI corresponding to the relevant IoT device. Specifically, the electronic device 200 may be assigned authorization for accessing the TV, the air conditioner, and a light controller in the living room, and control the TV, the air conditioner, and the light controller in the living room based on a UI 71 corresponding to the TV, a UI 72 corresponding to the air conditioner, and a UI 73 corresponding to the light controller which are in the living room.

Figure 8:
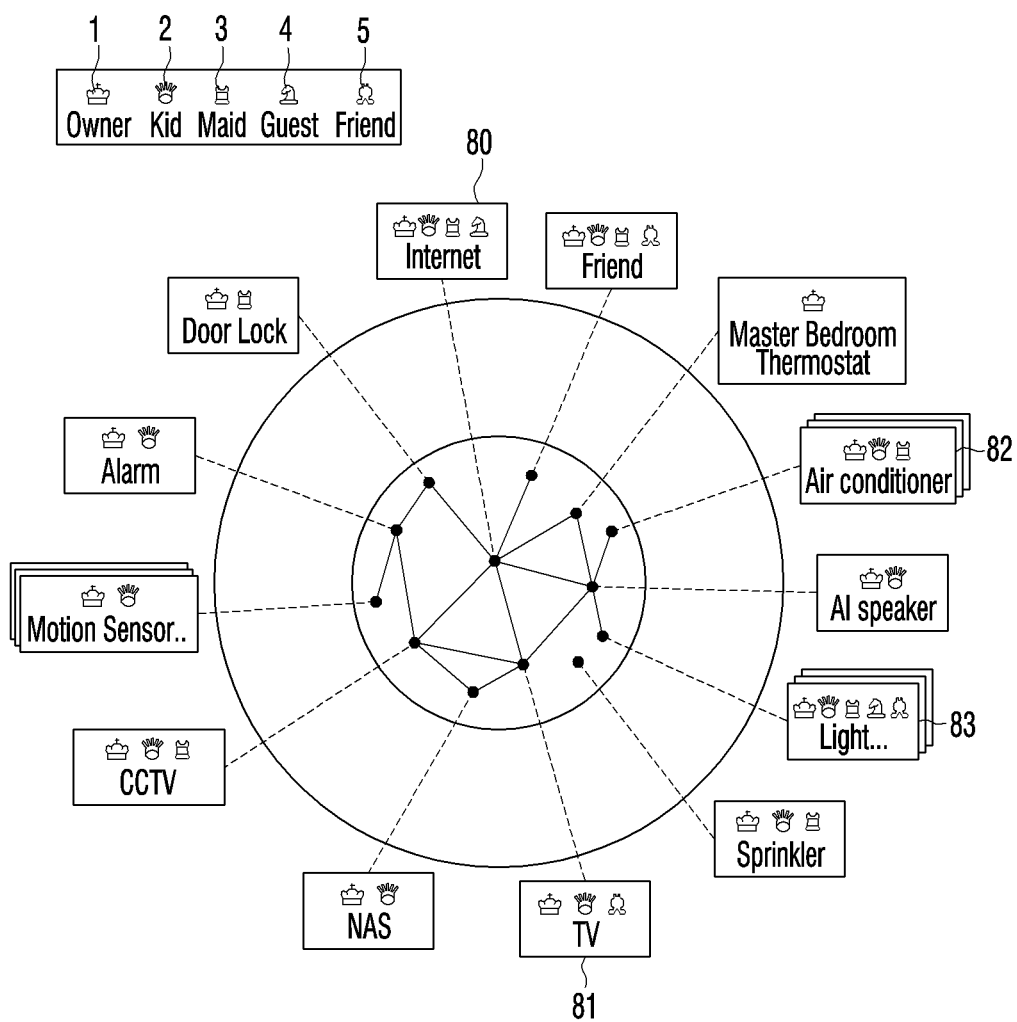
FIG. 8 is a diagram illustrating an authorization corresponding to a user according to an embodiment of the disclosure.

FIG. 8 is a diagram illustrating an authorization corresponding to a user according to an embodiment of the disclosure.

Referring to FIG. 8, a diagram of a plurality of IoT devices 300 forming the home area network (HAN) by being connected through wired or wireless means to the access point 100 is shown. However, this is merely one embodiment, and when implemented, home appliances capable of communication may be further included in addition to the IoT device shown.

The plurality of IoT devices 300 may form the HAN connected to the access point 100. Specifically, the plurality of IoT devices 300 may be directly or indirectly interconnected, and may control other IoT devices according to the authorization assigned. Specifically, an internet 80, a TV 81, an air conditioner 82, and a light 83 may respectively correspond to the IoT device 300, and the internet 80, the TV 81, the air conditioner 82, and the light 83 may be connected with the access point 100. Further, the access point 100 may assign authorization corresponding to the input password to the internet 80, the TV 81, the air conditioner 82, and the light 83. Here, the internet 80 may perform the same role as other IoT devices which may interact with the IoT device 300 included in the HAN. Further, the internet 80 may be an outlet of the HAN. Particularly, when the user is not home, the access point 100 may connect the user with the IoT device 300 of the HAN through the internet 80.

The TV 81 may be wirelessly connected with the access point 100 by inputting the password, and the access point 100 may assign the authorization (e.g., authorization with which the TV 81 may access relating to the CCTV, a network attached storage (NAS), the internet, and the AI speaker) corresponding to the input password. That is, the TV 81 may control the CCTV, the NAS, and the AI speaker. On the other hand, the air conditioner 82 and the light 83 may be connected with the access point 100 using wired means without a password. The air conditioner 82 and the light 83 may not be able to control other IoT devices because there is no input password and authorization corresponding to the password. The access point 100 may determine whether it is an access outside the authorization by using the password and the assigned authorization, and identify an abnormal security state when a portion from among the IoT devices are hacked and attacked.

The access point 100 may selectively connect the electronic device 200 to the IoT device 300 corresponding to the authorization assigned to the electronic device 200 from the HAN. Specifically, an owner 1, a kid 2, a maid 3, a guest 4, and a friend 5 may correspond to the electronic device respectively, and the owner 1, the kid 2, the maid 3, the guest 4, and the friend 5 may be connected to the access point 100 by inputting a password. Then, the access point 100 may assign the authorization corresponding to the input password to the owner 1, the kid 2, the maid 3, the guest 4, and the friend 5.

The access point 100 may assign the authorization corresponding to the input password, and the access point 100 may assign the authorization for accessing the TV 81 to the owner 1, the kid 2, and the friend 5. That is, the TV 81 may be controlled by the owner 1, the kid 2, and the friend 5. Then, the access point 100 may assign authorization to the guest 4 to access the internet 80 and the light 83, but not access the TV 81 and the air conditioner 82.

Figure 9:
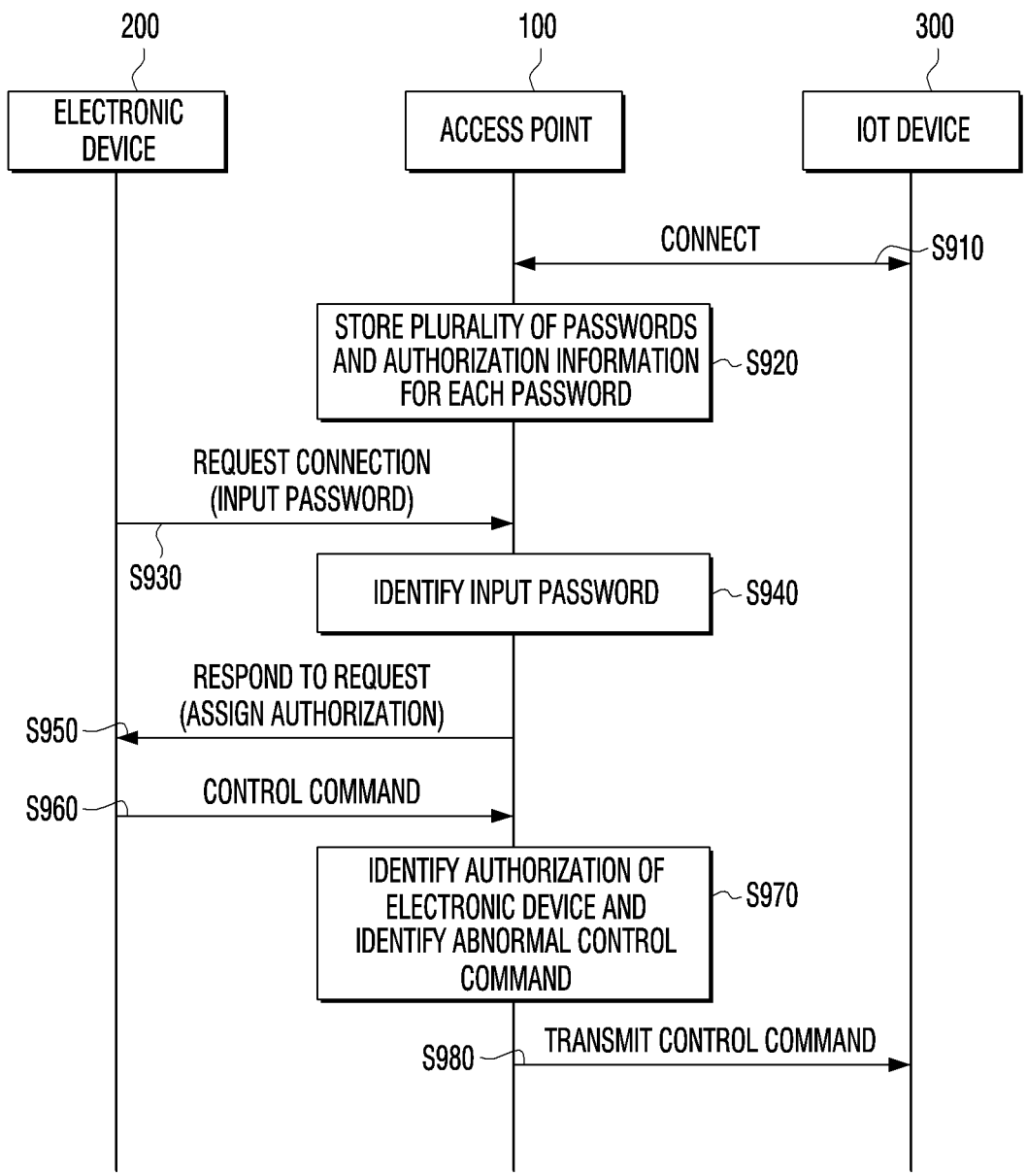
FIG. 9 is a sequence diagram illustrating a method of controlling an IoT device by an electronic device according to an embodiment of the disclosure.

FIG. 9 is a sequence diagram illustrating a method of controlling an IoT device by an electronic device according to an embodiment of the disclosure.

Referring to FIG. 9, the access point 100 and the IoT device 300 may be connected by wired and wireless means at operation S910. The IoT device 300 may form the HAN connected to the access point 100.

Then, the access point 100 may store the plurality of passwords and authorization information for each password at operation S920. Here, the plurality of passwords stored in the access point 100 may be a secret key which is required to connect to the access point 100. In addition, the plurality of passwords stored in the access point 100 may have different authorizations for accessing other electronic devices for each password.

Then, the electronic device 200 may request connection to the access point 100 by inputting the password stored in the access point 100 at operation S930. The plurality of passwords stored in the access point 100 may be duplicated and used by the other respective electronic devices 200.

The access point 100 may identify, based on a password being input from the electronic device 200, the input password and check whether it is a stored password at operation S940. Based on the input password being one from among the stored plurality of passwords, the access point may assign the authorization corresponding to the input password as a response to the connection request of the electronic device 200 at operation S950. Here, the authorization may mean an accessible device from among the IoT devices 300 connected to the access point 100.

The electronic device 200 may be assigned the authorization for accessing the IoT device 300 by the access point 100, and the electronic device 200 may transmit the control command for the IoT device 300 to an IoT device via the access point 100 at operation S960.

The access point 100 may identify the authorization of the electronic device 200, and identify an abnormal control command at operation S970. Specifically, the access point 100 may analyze the packet transmitted from the electronic device 200, and identify the abnormal control command or the abnormal security state by analyzing at least one from among the traffic type, the maximum packet size, and the maximum data rate analyzing the packet.

When there is no abnormal security state, the access point 100 may transmit the control command to the IoT device 300 at operation S980. Alternatively, the access point 100 may first transmit the control command, and based on an abnormal security state being identified, the access point 100 may block the packet transmitted to the IoT device 300.

FIG. 10 is a flowchart illustrating a communication connection method of an access point according to an embodiment of the disclosure.

Referring to FIG. 10, the access point may store the plurality of passwords and authorization information for each of the plurality of passwords at operation S1010. Here, the plurality of passwords stored in the access point 100 may be a secret key which is required to connect to the access point 100. In addition, the plurality of passwords stored in the access point 100 may have different authorizations for accessing other electronic devices for each password. Then, the plurality of passwords stored in the access point 100 may be duplicated and used by other respective electronic devices.

Then, based on the electronic device 200 requesting connection with one password from among the plurality of passwords at operation S1020, the access point 100 may assign the authorization corresponding to the connected password to the electronic device 200 based on the stored authorization information at operation S1030.

The access point 100 may be connected with the IoT device 300 using wired or wireless means. The access point 100 may selectively connect the IoT device corresponding to the assigned authorization to the electronic device 200. That is, the authorization corresponding to the password may be an authorization for accessing a specific IoT device.

Then, the access point 100 may store or update authorization information which is set based on the user command. In addition, the one-time password corresponding to the pre-set authorization may be generated based on the user command, and when connection of the access point corresponding to the generated one-time password with the electronic device is ended, the generated one-time password may be deleted.

The various embodiments of the disclosure may be implemented with software including instructions stored in a machine-readable storage media (e.g., computer). The machine may call a stored instruction from the storage medium, and as a device capable of operating according to the called instruction, may include an electronic device (e.g., access point 100, electronic device 200, IoT device 300) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Here, 'non-transitory' merely means that the storage medium is tangible and does not include a signal, and the term does not differentiate data being semi-permanently stored or being temporarily stored in the storage medium.

According to an embodiment, a method according to the various embodiments disclosed in the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

Each of the elements (e.g., a module or a program) according to various embodiments may be formed as a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An access point device, comprising:
communication circuitry configured to support an Internet of Things (IoT) network;
at least one processor; and
memory comprising one or more storage media storing instructions which, when executed by the at least one processor individually or collectively, cause the access point device to:
store a plurality of passwords to access electronic devices in the IoT network and authorization information for each of the plurality of passwords,
receive, from an electronic device, a connection request including a password,
determine whether the received password corresponds to any password among the plurality of passwords stored in the memory,
identify an authorization based on determining that the received password corresponds to any password among the plurality of passwords,
based on the identified the authorization, identify one or more electronic devices in the IoT network,
assign, to the electronic device, the identified one or more electronic devices, and
transmit at least one data received form the electronic device to the identified one or more electronic devices.

2. The access point device of claim 1,
wherein the authorization information for each of the plurality of passwords comprises at least one from among an external network access authorization, an internal network access authorization, an access authorization for an Internet of Things (IoT) device connected to an internal network, or access authorization for a group of IoT devices connected to the internal network, and
wherein the processor is further configured to selectively connect the electronic device to the at least one from among the external network, the internal network, the IoT device connected to the internal network, or the group of IoT devices connected to the internal network based on the authorization information.

3. The access point device of claim 1, wherein the processor is further configured to:
store, in the memory, authorization information set based on a user command received through the communication circuitry,
generate a one-time password corresponding to a pre-set authorization based on the user command, and
delete the generated one-time password based on a connection between the access point corresponding to the generated one-time password and the electronic device ending.

4. The access point device of claim 2, wherein the processor is further configured to:

analyze at least one packet received from the electronic device or from the identified one or more electronic devices comprised in the internal network, and identify whether the at least one packet is hacked based on the analyzed at least one packet.

5. The access point device of claim 4, wherein, to analyze the at least one packet, the processor is further configured to:

analyze at least one from among a traffic type, a maximum packet size, or a maximum data rate of the at least one packet.

6. The access point device of claim 4 wherein the processor is further configured to:

identify whether the at least one packet is hacked based on a prior use history of the electronic device or each of the IoT devices comprised in the internal network.

7. The access point device of claim 1, wherein the processor is further configured to:

identify an authorization accessible by the electronic device based on the stored authorization information and the password, and identify whether at least one packet is hacked based on the identified authorization.

8. The access point device of claim 1, wherein the each of the plurality of passwords is formed of a front end part and a rear end part, wherein the front end part is set based on the authorization information or a role, and wherein the rear end part is set with a text based on a user input or an arbitrarily arranged text.

9. A communication connection method of an access point device, the method comprising:

storing a plurality of passwords to access electronic devices in IoT network and authorization information for each of the plurality of passwords;

receiving, from an electronic device, a connection request including a password;

determining whether the received password corresponds to any password among the plurality of passwords stored in memory;

identify an authorization based on determining that the received password corresponds to any password among the plurality of passwords assigning, to the electronic device identified one or more electronic devices in the IoT network; and transmit at least one data received form the electronic device to the identified one or more electronic devices.

10. The method of claim 9, further comprising:

connecting the electronic device to an internal network.

11. The method of claim 9, wherein the authorization information for each of the plurality of passwords comprises at least one from among an external network access authorization, an internal network access authorization, an access authorization for an Internet of Things (IoT) device connected to an internal network, or access authorization for a group of IoT devices connected to the internal network.

12. The method of claim 9, wherein the storing comprises, deleting a generated one-time password based on a connection between the access point corresponding to the generated one-time password and the electronic device ending.

13. The method of claim 11, further comprising:

analyzing at least one packet received from the electronic device or from the identified one or more electronic devices comprised in the internal network; and identifying whether the at least one packet is hacked based on the analyzed at least one packet.

14. The method of claim 9, further comprising:

identifying an authorization accessible by the electronic device based on the stored authorization information and the password; and identifying whether at least one packet is hacked based on the identified authorization.

15. A computer readable non-transitory recording medium comprising a program for executing a communication connection method of an access point device, the method comprising:

storing a plurality of passwords to access electronic devices in the IoT network and authorization information for each of the plurality of passwords;

receiving, from an electronic device, a connection request including a password;

determining whether the received password corresponds to any password among the plurality of passwords stored in memory;

identifying an authorization based on determining that the received password corresponds to any password among the plurality of passwords;

based on the identified the authorization, identifying one or more electronic devices in the IoT network;

assigning, to the electronic device, the identified one or more electronic devices; and transmit at least one data received form the electronic device to the identified one or more electronic devices.

* * * * *